(12) United States Patent
Donauer et al.

(10) Patent No.: US 10,881,998 B2
(45) Date of Patent: Jan. 5, 2021

(54) FILTER DEVICE, IN PARTICULAR GAS FILTER

(71) Applicant: MANN+HUMMEL GmbH, Ludwigsburg (DE)

(72) Inventors: Nadine Donauer, Fellbach (DE); Pedro Miguel Pereira Madeira, Bietigheim-Bissingen (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 0 days.

(21) Appl. No.: 16/177,532

(22) Filed: Nov. 1, 2018

(65) Prior Publication Data

US 2019/0070545 A1  Mar. 7, 2019

Related U.S. Application Data

(63) Continuation of application No. PCT/EP2017/055266, filed on Mar. 7, 2017.

(30) Foreign Application Priority Data

May 3, 2016  (DE) .................. 10 2016 005 354

(51) Int. Cl.
*B01D 46/24*  (2006.01)
*B01D 46/00*  (2006.01)
*F02M 35/024*  (2006.01)

(52) U.S. Cl.
CPC ...... *B01D 46/0005* (2013.01); *B01D 46/2411* (2013.01); *F02M 35/02416* (2013.01);
(Continued)

(58) Field of Classification Search
CPC ........ B01D 2271/022; B01D 2271/027; B01D 46/2411; B01D 46/2414; B01D 46/0005; B01D 2265/06
See application file for complete search history.

(56) References Cited

U.S. PATENT DOCUMENTS

| | | | |
|---|---|---|---|
| 2006/0286885 A1 | 12/2006 | Schuh et al. | |
| 2009/0217632 A1 | 9/2009 | Coulonvaux et al. | |
| 2010/0263339 A1* | 10/2010 | Steins | B01D 46/0024 55/337 |

FOREIGN PATENT DOCUMENTS

| | | |
|---|---|---|
| DE | 202006014784 U1 | 2/2008 |
| DE | 102008027279 A1 | 4/2009 |

(Continued)

*Primary Examiner* — Robert Clemente
(74) *Attorney, Agent, or Firm* — James Hasselbeck

(57) ABSTRACT

A filter device has an annular filter element with a filter medium body for radial fluid flow relative to a longitudinal axis. A sealing element arranged at an end face of the filter medium body seals relative to a housing component of a filter housing receiving the filter element. The sealing element has support walls delimiting a slit between them. The housing component has a receiving groove engaging across the sealing element and provided with opposed side walls. The housing component has a support rib projecting into slit. The support walls each have a first support surface at a side facing the slit and a second support surface at a side facing away from the slit. The side walls of the receiving groove are radially supported at the second support surfaces of the support walls. The support rib is supported radially at the first support surfaces of the support walls.

15 Claims, 3 Drawing Sheets

(52) U.S. Cl.
CPC .. *B01D 2271/022* (2013.01); *B01D 2271/027* (2013.01); *B01D 2275/208* (2013.01)

(56) References Cited

FOREIGN PATENT DOCUMENTS

| | | |
|---|---|---|
| DE | 102009008450 A1 | 8/2010 |
| DE | 112008002433 A5 | 9/2010 |
| DE | 102014000718 A1 | 8/2014 |
| DE | 102014006850 A1 | 12/2014 |
| EP | 2227307 B1 | 9/2010 |
| EP | 2396102 A1 | 12/2011 |
| EP | 2764904 A1 | 8/2014 |
| EP | 2764905 A1 | 8/2014 |
| EP | 2771092 A2 | 9/2014 |
| JP | 2003336552 A | 11/2003 |

\* cited by examiner

US 10,881,998 B2

FILTER DEVICE, IN PARTICULAR GAS FILTER

CROSS-REFERENCE TO RELATED APPLICATIONS

This application is a continuation application of international application No. PCT/EP2017/055266, having an international filing date of 7 Mar. 2017 and designating the United States, the international application claiming a priority date of 3 May 2016 based on prior filed German patent application No. 10 2016 005 354.2, the entire contents of the aforesaid international application and the aforesaid German patent application being incorporated herein by reference.

BACKGROUND OF THE INVENTION

The invention concerns a filter device, in particular a gas filter, such as, for example, an air filter, that comprises a filter medium body that in radial direction can be flowed through by the fluid to be cleaned, with at least one sealing element arranged at the end face at the filter medium body for sealing relative to a housing component of a filter housing receiving the filter element, wherein the sealing element comprises at least one slit, wherein a receiving groove at the housing component engages across the sealing element and a support rib of the housing component projects into the slit.

DE 10 2009 008 450 A1 discloses a filter device that is used for filtration of the intake air of an internal combustion engine. The filter device comprises an annular filter element in a receiving filter housing. The filter element comprises a filter medium body with end face end disks and an inwardly positioned central tube as a support frame. A sealing element is formed integrally with an end disk and comprises two axially projecting sealing beads with an intermediately positioned slit into which a projection at the bottom side of a housing component projects. A reinforcement plate is integrated into the end disk and is completely enveloped by the sealing material of the end disk.

It is the object of the invention to configure a filter device with an annular filter element with simple constructive measures in such a way that for an extended operating time seal-tightness between raw side and clean side is ensured in the region of the end face.

SUMMARY OF THE INVENTION

This object is solved according to the invention by a filter element provided with a sealing element that comprises support walls comprising the slit which form, at the side facing the slit as well as at the side facing away from the slit, a support surface at which a side wall of the receiving groove or the support rib, respectively, is supported in radial direction relative to the longitudinal axis of the filter element. The dependent claims provide expedient further developments.

The filter device according to the invention is used preferably for gas filtration, in particular for filtration of the intake air of internal combustion engines. However, also other embodiments for filtration of liquid media are possible.

The filter device comprises an annular filter element with a filter medium body at which the filtration is taking place. The filter medium body is flowed through in radial direction by the fluid to be cleaned, preferably in radial direction from the exterior to the interior, so that the interior which is annularly enclosed by the filter medium body forms the clean space from which the purified fluid is axially dischargeable. The filter medium body is preferably embodied as a bellows wherein at least at one end face, preferably at both oppositely positioned end faces, a sealing end disk is arranged at the filter medium body.

In the assembled state, a housing component of the filter device, for example, a clean-side fluid connector, is resting against a sealing element that is arranged at the end face at the filter element. The sealing element comprises two neighboring support walls or support beads between which a slit is positioned into which a support rib at the housing component that engages across the filter element projects. The support rib is located in a receiving groove at the housing component wherein the receiving groove is delimited by two side walls of the housing component which in radial direction—relative to the longitudinal axis of the filter element—are arranged spaced apart from each other.

The support walls of the sealing element form at the side facing the intermediately positioned slit as well as at the side facing away from the slit a support surface, respectively, at which a side wall of the receiving groove and the support rib projecting into the receiving groove are supported in radial direction, respectively. Thus, there are a total of at least four support surfaces at the sealing element for the housing component to be attached, wherein each support surface at the same time can form a sealing surface so that, as a whole, a high and permanent seal tightness between raw side and clean side at the outer side of the filter element is ensured. Preferably, at least two sealing surfaces are present which are formed by the respective sides of the support walls facing the slit and/or the respective sides of the support walls facing away from the slit so that one radial seal is formed, respectively.

In one embodiment, the respective sides of the support walls which are facing the slit are seal-tightly resting against the support rib. Alternatively or additionally, the respective sides of the support walls which are facing away from the slit are seal-tightly resting against the side walls of the receiving groove.

The supporting and sealing concept according to the invention is in particular suitable for filter elements which have an oval or stadium-shaped cross section. The use in filter medium bodies with circular cross section is however also possible. The fold edges of the filter medium body can extend parallel to each other or can extend toward each other.

The housing component is supported substantially only in radial direction at the support surfaces of the support walls while no or only minimal forces are active between the housing component and the sealing element in axial direction. No axial support action of the housing component to be attached takes place at the support walls so that the support walls are relieved of correspondingly high axial forces and no risk of damage to the component due to such axial forces exists.

The receiving groove engages about both support walls so that the inner sides of the side walls of the receiving groove are resting against the outer sides of the support walls and, in addition, the support rib projecting into the slit contacts both inner sides of the support walls of the sealing element. The support walls are positioned in radial direction without clearance in the receiving groove in order to ensure a corresponding contact between the support surfaces at the support walls and the side walls of the receiving groove or the support rib.

In an advantageous embodiment, the end face of a side wall which delimits the receiving groove is resting against the sealing element but with a spacing to the support walls whereby through this side wall of the receiving groove an axial support force is transmitted between the component to be attached and the filter element. The spatial as well as functional separation of radial sealing action and axial support action ensures the sealing function at the lateral support surfaces of the support walls and the axial support function through the end face of the side wall of the receiving groove. In the region of the sealing element, the side wall of the receiving groove is resting with its end face against a radially extending section of the sealing element. Advantageously, the radially inwardly positioned side wall of the receiving groove provides axial support, wherein, in addition or alternatively, an axial support at the sealing element is possible also through the radially outwardly positioned side wall of the receiving groove.

End disk and sealing element can be embodied as separate components wherein the sealing element is expediently connected with the end disk or is lying on the end disk with contact. The sealing element is, for example, placed onto the end disk or, in a further embodiment, attached to the end disk by means of foaming or injection molding or casting.

In an alternative embodiment, end disk and sealing element are configured as a common component that is produced, for example, by a common casting or foaming process.

According to a further advantageous embodiment, the side wall of the receiving groove through which the axial supporting force is transmitted between the housing component and the filter element has a greater axial extension than the support rib which is arranged within the receiving groove and, in the assembled state, engages the slit between the support walls of the sealing element. The greater axial extension of the receiving groove in comparison to the support rib ensures that the axial supporting force is completely or mostly transmitted through the receiving groove and not through the support rib.

According to a further expedient embodiment, the filter element is provided with a central tube at the inner side of the filter medium body which forms a support frame and is comprised of longitudinal and circumferential stays between which openings are formed for flow of the fluid to be filtered therethrough. The central tube is provided with a support collar which is a carrier of the sealing element or is embedded therein. The support collar extends advantageously at the end face of the central tube radially outwardly and is capable of introducing the axial forces, which are acting in operation of the filter element, into the central tube. In this way, it is ensured that the sealing element, in particular in the region of the support walls, where also the radial sealing action is generated, and of the intermediately positioned slit, is not loaded or deformed by the axial supporting forces. The supporting forces are transferred from the housing component into the support collar and from the latter into the central tube.

The support collar is preferably formed together with the central tube as one piece. Central tube and support collar can be embodied as an injection molded plastic component. Moreover, an embodiment of the support collar separate from the central tube is conceivable wherein in this case the support collar is attached to the central tube in order to be able to transmit the forces which are acting in axial direction into the central tube.

The sealing element envelopes, according to a further advantageous embodiment, the support collar at least partially, optionally completely. The sealing element can be configured such that the end region of the filter medium body at which the sealing element is seated is engaged across by the sealing element at its radial inner side and at its radial outer side. The support collar can comprise a grid structure with grid openings which are filled by the sealing material of the sealing element. In this way, a fixed connection between the support collar and the sealing element is produced.

According to a further expedient embodiment, the sealing element is free of support elements in the region of the support walls delimiting the slit. The support walls in this embodiment are held in position by their inherent stiffness alone, which is sufficient for the sealing function with radial contact at the side walls of the receiving groove or the support rib at the housing component. The support rib projecting into the slit between the support walls, on the one hand, and the side walls of the receiving groove which are contacting the outer sides of the support walls, on the other hand, stabilize the sealing element with the support walls.

The support collar extends in radial direction at least up to the position at the sealing element at which the side wall of the receiving groove is resting with its end face against the sealing element for the axial support action. It can be expedient to extend the support collar in radial direction still farther past the position at which the side wall of the receiving groove loads with its end face the sealing element, for example, up to the first support wall, up to the slit, or up to the second support wall.

According to yet another expedient embodiment, all support walls of the sealing element are positioned radially outside of the central tube. The support walls are in particular positioned immediately at the filter medium body.

BRIEF DESCRIPTION OF THE DRAWINGS

Further advantages and expedient embodiments can be taken from the additional claims, the figure description, and the drawings.

In the Figures, same components are provided with same reference characters.

DESCRIPTION OF PREFERRED EMBODIMENTS

Figure 1:
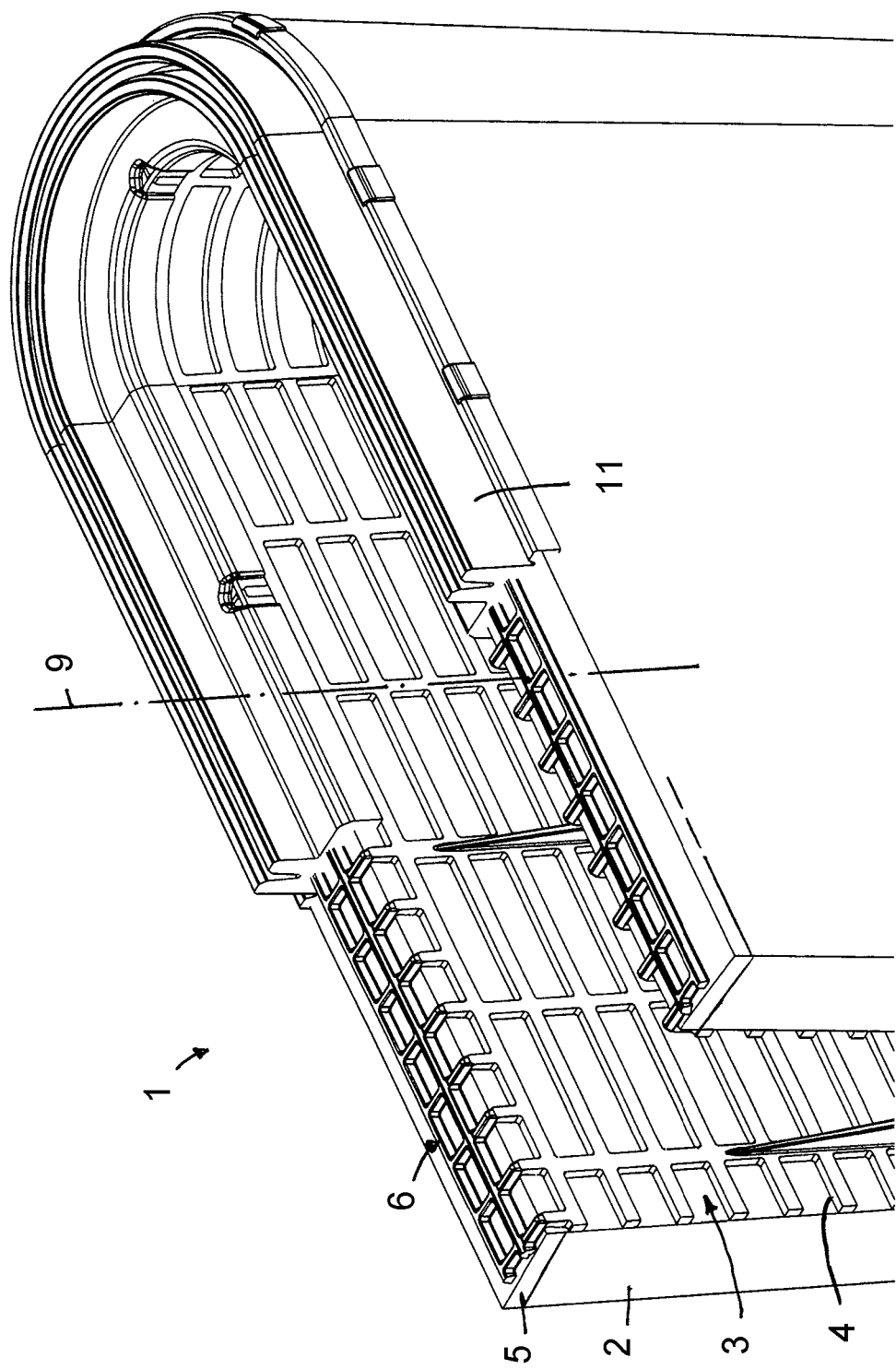
FIG. 1 shows in a perspective illustration an annular filter element that comprises at the inner side of the filter medium body a central tube with which an axially projecting support collar is formed as one piece.

In FIG. 1, a filter element 1 is illustrated that can be used for gas filtration, for example, for an air filter of an internal combustion engine. The filter element 1 is configured annularly and comprises in the embodiment a greatly elongate oval cross section with longitudinal sides that are formed straight or with only minimal curvature in outward direction. The filter element 1 comprises an annularly closed filter medium body 2 at which the filtration of the fluid to be cleaned takes place. The filter medium body 2 is flowed through in radial direction from the exterior to the interior by the fluid so that the interior in the filter medium body 2 forms the clean side from which the purified fluid is axially discharged, in the direction of the longitudinal axis 9 of the filter element 1. The interior 3 is lined by a central tube 4 which forms a support grid and which is resting against the inner side of the filter medium body 2 and is embodied preferably as an injection molded plastic component. The interior is delimited at the lower end face, not illustrated, by a closed end disk which covers the filter medium body at the end face.

A support collar 6 is formed together with the central tube 4 as one piece and extends in radial direction and is oriented at the end face of the central tube 4 in radial direction outwardly. The support collar 6 is connected at the radially inwardly positioned side, facing the interior 3, to the central tube 4 and is in particular formed as one piece together with the central tube 4.

The support collar 6 is provided with a grid structure that has a plurality of cutouts. These cutouts in the support collar 6 serve for receiving sealing material of a sealing element 11 that is arranged at the support collar 6. The sealing element 11 is injection molded or foamed onto the support collar 6; the sealing material is, for example, a PU foam. In that the sealing material penetrates into the cutouts of the grid structure of the support collar 6, a fixed, non-detachable connection between the sealing element 11 and the support collar 6 is ensured. The support collar 6 is advantageously enveloped outwardly completely by the sealing material of the sealing element 11.

Figure 2:
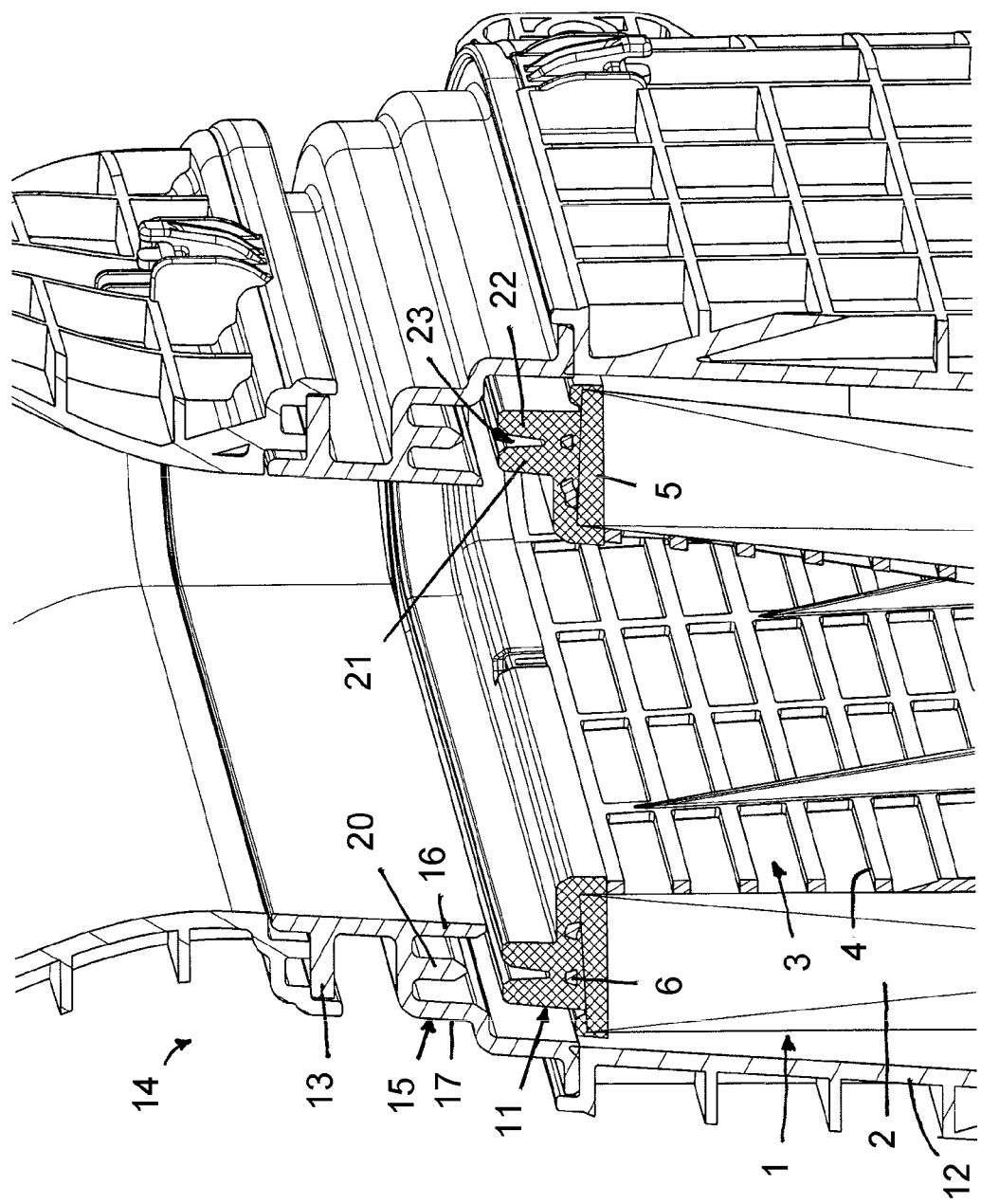
FIG. 2 shows a filter device with a filter housing and the filter element of FIG. 1 during assembly at an outlet socket.
Figure 3:
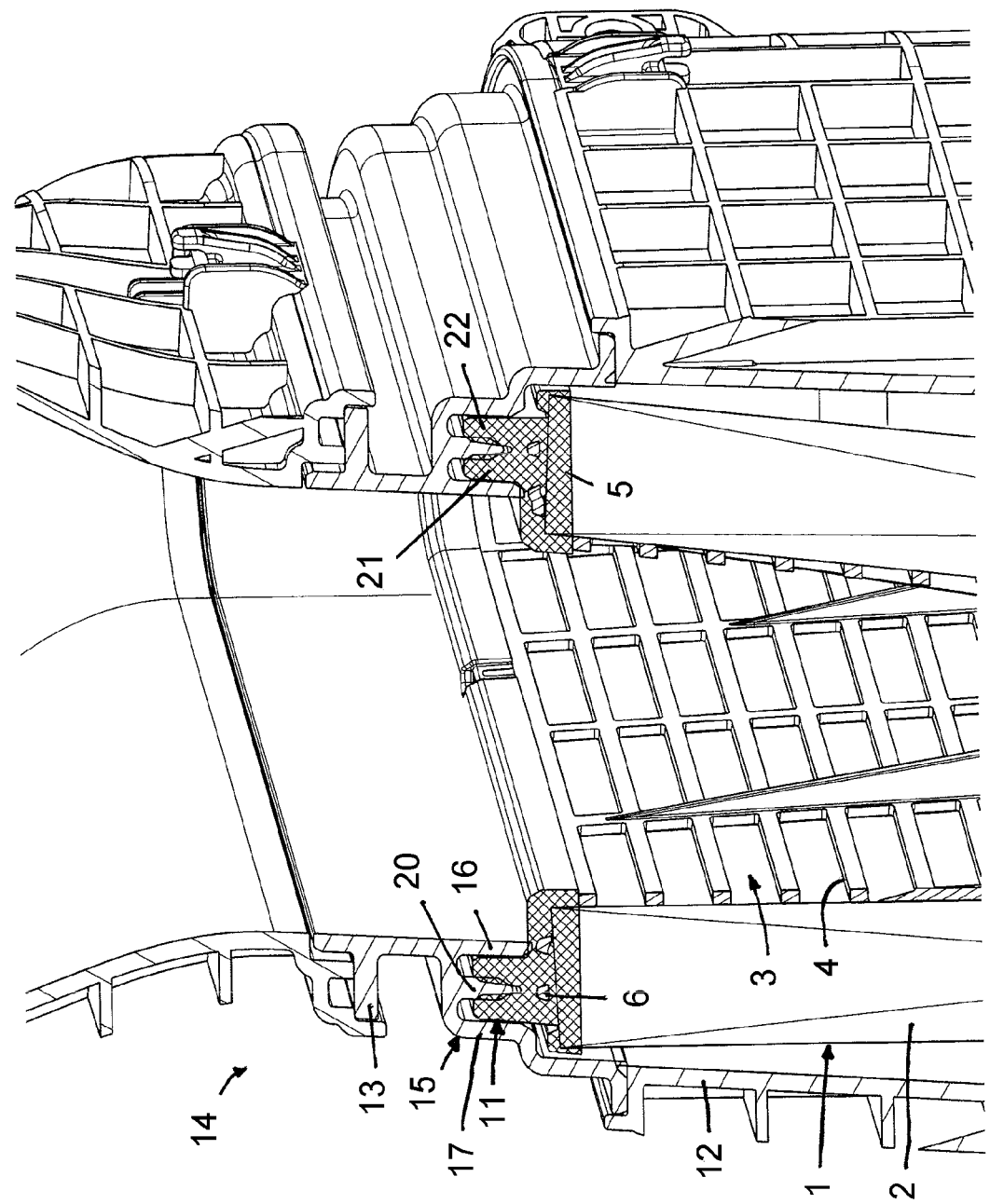
FIG. 3 shows an illustration corresponding to FIG. 2, however in the mounted state.

In FIGS. 2 and 3, a filter device 14, in particular for gas filtration, is illustrated with the filter element 1 in a filter housing which comprises an outlet socket 13 for the purified gas and a filter base housing 12 for receiving the filter element 1, wherein the filter base housing 12 can be placed onto the outlet socket 13 and is connectable thereto. For clarity, in FIG. 2 the components of the filter device 14 are illustrated partially in exploded illustration while FIG. 3 shows the installed position.

The sealing element 11 at the support collar 6 is formed together with the end disk 5 as one piece, which covers an end region of the filter medium of the filter medium body 2 at the end face and engages across radially inwardly and radially outwardly.

At the bottom side of the outlet socket 13 a receiving groove 15 is provided which in radial direction is delimited by side walls 16 and 17 which extend radially at a spacing and concentric relative to each other. At the inwardly positioned bottom of the receiving groove 15, a support rib 20 is integrally formed which in radial direction is located at the center of the receiving groove 15. The axial extension of the support rib 20 is smaller than the axial extension of the side walls 16 and 17 delimiting the receiving groove 15.

At the sealing element 11, two support walls 21 and 22 are integrally formed between which a slit 23 is located (FIG. 2). The two support walls 21 and 22 extend concentric and at a spacing relative to each other. The slit 23 serves for receiving the support rib 20 provided in the receiving groove 15 at the outlet socket 13. In the mounted state according to FIG. 3, the side walls 16 and 17 of the receiving groove 15 are resting against the outer sides of the support walls 21 and 22. In this way, together with the support rib 20 projecting into the slit 23, a total of four support surfaces between the sealing element 11 and the housing component 13 are provided in radial direction, i.e., one respectively between the inner sides of the side walls 16 and 17 and the outer sides of the support walls 21 and 22 as well as one respectively between the side faces of the support rib 20 and the inner sides of the support walls 21 and 22. The radial spacing between the side walls 16 and 17 of the receiving groove 15 is designed such that together with the support rib 20 projecting into the slit 23, which forces the support walls 21 and 22 at least minimally radially in outward direction, a clearance-free reception and contact in radial direction between the support walls 21, 22 and the correlated surfaces in the receiving groove 15 is provided. At least two of the four support surfaces between the sealing element 11 and the housing component 13 form at the same time a sealing surface and ensure a flow-tight connection between the end face of the filter element 1 and the outlet socket 13. For forming a sealing surface, one side of the sealing element 11 is preferably resting full-faced at a side wall 16, 17 or at the support rib 20 of the housing component 13. A side wall 16, 17 of the receiving groove 15 or a side of the support rib 20 with supporting function but without sealing function can be provided, for example, with ribs.

In the mounted state according to FIG. 3, the radially inwardly positioned side wall 16 of the receiving groove 15 is contacting with its end face the radially or horizontally extending section of the sealing element 11. By means of side wall 16, the outlet socket 13 is axially supported at the sealing element 11 and thus at the filter element 1. The side wall 16 is positioned immediately at the outwardly positioned side of the support wall 21, wherein the end face of the side wall 16 does not load the support wall 21 but the horizontally or radially extending section of the sealing element 11. Since the support collar 6 is integrated in the radial section of the sealing element 11, the axial supporting force is transferred onto the support collar 6 which transfers the force into the central tube 4. In this way, it is ensured that the end face of the filter medium body 2 is relieved of the axial supporting forces. Also, the support walls 21 and 22 take on no axial support function but only a sealing function relative to the side walls 16 and 17 at the outlet socket 13.

What is claimed is:

1. A filter device comprising:
    an annular filter element, comprising:
        an annular filter medium body which surrounds a longitudinal axis, the annular filter medium body configured to be flowed through in a radial direction by a fluid to be cleaned relative to the longitudinal axis,
        wherein an axial, as used herein, refers to a direction of the longitudinal axis,
        wherein a radial, as used herein, as a direction traverse to the longitudinal axis;
        a central tube which is annular and elongated axially, the central tube formed as a grid structure and arranged in a radial interior of the annular filter medium body, an axial end of the axially elongated central tube is folded radially outwardly and projecting radially outwardly at and arranged on an axial end face of the filter medium body, forming a circumferentially extending support collar which projects radially outwardly from the axial end of the axially elongated central tube and extends only partially across the axial end face of the filter medium body,
    at least one sealing element arranged on and protruding axially outwardly from the circumferentially extending support collar of the axially elongated central tube, the at least one sealing element configured to be received into seal to a receiving groove of a housing component of a filter housing configured to receive the annular filter element, the at least one sealing element including:
        a first annular sealing projection, projecting axially outwardly away from the circumferentially extending support collar;
        a second annular sealing projection, projecting axially outwardly away from the circumferentially extending support collar and spaced radially inwardly away from the first annular sealing projection;

wherein the spacing between the annular sealing projections forms an annular slit;

wherein the annular sealing projections each have a first support surface at a first side facing the annular slit and a second support surface at a second side facing away from the annular slit, the annular slit configured to receive a support rib of the receiving groove;

wherein the first and second support surfaces are configured to support the annular filter element against opposed sidewalls of the receiving groove.

2. The filter device according to claim 1, wherein the support collar is embedded in a material of the at least one sealing element.

3. The filter device according to claim 1, wherein the support collar and the central tube are formed together as one piece.

4. The filter device according to claim 1, wherein the at least one sealing element envelopes the support collar, such that the support collar is embedded into the at least one sealing element.

5. The filter device according to claim 1, wherein the support collar comprises a grid structure with grid openings.

6. The filter device according to claim 1, wherein all of the annular sealing projections of the at least one sealing element are arranged outside of the central tube in the radial direction.

7. The filter device according to claim 1, wherein the at least one sealing element is free of support elements in a region of the annular sealing projections.

8. A filter device comprising:
a housing component comprising:
  a receiving groove having opposed sidewalls, the receiving groove having
    a support rib formed as a projection in a base of the receiving groove and projecting between the opposed sidewalls;
an annular filter element, comprising:
  an annular filter medium body surrounding a longitudinal axis, the annular filter medium body configured to be flowed through in a radial direction by a fluid to be cleaned relative to the longitudinal axis,
  wherein an axial, as used herein, refers to a direction of the longitudinal axis,
  wherein a radial, as used herein, as a direction traverse to the longitudinal axis;
  a central tube which is annular and elongated axially, the central tube formed as a grid structure and arranged in a radial interior of the annular filter medium body, an axial end of the axially elongated central tube is folded radially outwardly and projecting radially outwardly at and arranged on an axial end face of the filter medium body, forming a circumferentially extending support collar which projects radially outwardly from the axial end of the axially elongated central tube and extends at least partially across the axial end face of the filter medium body;
  wherein the circumferentially extending support collar has a plurality of through openings which open towards the axial end face of the filter medium body;
  at least one sealing element arranged on and protruding axially outwardly from the circumferentially extending support collar of the axially elongated central tube, the at least one sealing element configured to engage with and seal to the receiving groove of the housing component of a filter housing configured to receive the annular filter element, the at least one sealing element including:
    a first annular sealing projection, projecting axially outwardly away from the circumferentially extending support collar;
    a second annular sealing projection, projecting axially outwardly away from the circumferentially extending support collar and spaced radially inwardly away from the first annular sealing projection;
  wherein the spacing between the annular sealing projections forms an annular slit;
  wherein the annular sealing projections each have a first support surface at a first side facing the annular slit and a second support surface at a second side facing away from the annular slit;
wherein the support rib engages into the annular slit between the annular sealing projections of the at least one sealing element;
wherein the opposed sidewalls of the receiving groove contact against the second support surface of the annular sealing projections;
wherein the opposed sidewalls of the receiving groove are supported against the second support surface of the annular sealing projections in the radial direction;
wherein the support rib is supported against the first support surface of the annular sealing projections.

9. The filter device according to claim 8, wherein the opposed side walls of the receiving groove include
  a first side wall comprising an end face resting against the at least one sealing element for transmitting an axial supporting force.

10. The filter device according to claim 9, wherein the first side wall has a greater axial extension than the support rib.

11. The filter device according to claim 9, wherein the first side wall is a radially inwardly positioned side wall of the receiving groove and is supported with the end face axially at the at least one sealing element.

12. The filter device according to claim 8, wherein the opposed side walls of the receiving groove include
  a first side wall comprising an end face resting axially against the at least one sealing element for transmitting an axial supporting force,
  wherein the support collar extends in the radial direction at least up to the first side wall.

13. The filter device according to claim 8, wherein the first sides of the annular sealing projections are seal-tightly resting against the support rib.

14. The filter device according to claim 8, wherein the second sides of the annular sealing projections are seal-tightly resting against the opposed side walls of the receiving groove.

15. The filter device according to claim 8, wherein the first sides of the annular sealing projections are seal-tightly resting against the support rib, and
wherein the second sides of the annular sealing projections are seal-tightly resting against the opposed side walls of the receiving groove.

* * * * *